US007797587B2

(12) United States Patent
Vasudevan et al.

(10) Patent No.: US 7,797,587 B2
(45) Date of Patent: Sep. 14, 2010

(54) SYSTEM AND METHOD OF RECOVERING FROM FAILURES IN A VIRTUAL MACHINE

(75) Inventors: Bharath Vasudevan, Austin, TX (US); Ananda Sankaran, Austin, TX (US); Sumankumar Singh, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 11/759,099

(22) Filed: Jun. 6, 2007

(65) Prior Publication Data

US 2008/0307259 A1    Dec. 11, 2008

(51) Int. Cl.
    *G06F 11/00* (2006.01)
(52) U.S. Cl. ...................................................... 714/47
(58) Field of Classification Search ............... 714/2–12, 714/15, 16, 20–24, 31, 37–39, 45, 47, 48
See application file for complete search history.

(56) References Cited

U.S. PATENT DOCUMENTS

| | | | | |
|---|---|---|---|---|
| 4,674,038 A * | 6/1987 | Brelsford et al. | ............... | 714/15 |
| 5,437,033 A * | 7/1995 | Inoue et al. | ................... | 714/10 |
| 5,805,790 A * | 9/1998 | Nota et al. | ..................... | 714/10 |
| 6,625,751 B1 * | 9/2003 | Starovic et al. | ............... | 714/11 |
| 6,691,250 B1 * | 2/2004 | Chandiramani et al. | ....... | 714/25 |
| 6,728,896 B1 * | 4/2004 | Forbes et al. | .................... | 714/4 |
| 6,947,957 B1 | 9/2005 | Lange | .......................... | 707/200 |
| 7,058,629 B1 | 6/2006 | Colrain et al. | ................. | 707/8 |
| 7,206,836 B2 | 4/2007 | Dinker et al. | ............... | 709/224 |
| 7,243,267 B2 * | 7/2007 | Klemm et al. | ................ | 714/38 |
| 7,409,577 B2 * | 8/2008 | Wing et al. | ..................... | 714/4 |
| 2003/0167421 A1 * | 9/2003 | Klemm | ......................... | 714/37 |
| 2007/0094659 A1 * | 4/2007 | Singh et al. | .................... | 718/1 |
| 2007/0174658 A1 * | 7/2007 | Takamoto et al. | .............. | 714/4 |

OTHER PUBLICATIONS

Compatibility Guide For ESX Server 3.x, vmware, 28 pages, Oct. 10, 2007.

* cited by examiner

*Primary Examiner*—Nadeem Iqbal
(74) *Attorney, Agent, or Firm*—Baker Botts L.L.P.

(57) ABSTRACT

A method and systems for recovering from a failure in a virtual machine are provided. In accordance with one embodiment of the present disclosure, a method for recovering from failures in a virtual machine is provided. The method may include, in a first physical host having a host operating system and a virtual machine running on the host operating system, monitoring one or more parameters associated with a program running on the virtual machine, each parameter having a predetermined acceptable range. The method may further include determining if the one or more parameters are within their respective predetermined acceptable ranges. In response to determining that the one or more parameters associated with the program running on the virtual machine are not within their respective predetermined acceptable ranges, a management module may cause the application running on the virtual machine to be restarted.

9 Claims, 4 Drawing Sheets

SYSTEM AND METHOD OF RECOVERING FROM FAILURES IN A VIRTUAL MACHINE

TECHNICAL FIELD

The present disclosure relates in general to clustered network environments, and more particularly to a system and method of recovering from failures in a virtual machine.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including servers, workstations, and other computers, are often grouped into computer networks, including networks having a client-server architecture in which servers may access storage, including shared storage, in response to request from client computers of the network. The servers, also known as physical hosts, may include one or more virtual machines running on the host operating system and the host software of the physical host. Each virtual machine may comprise a virtual or "guest" OS. A single physical host may include multiple virtual machines in which each virtual machine appears as a logical machine on a computer network. The presence of one or more virtual machines on a single physical host provides a separation of the hardware and software of a networked computer system. In certain instances, each virtual machine could be dedicated to the task of handling a single function. For example, in a particular embodiment, one virtual machine could be a mail server, while another virtual machine present on the same physical host could be a file server. In addition, any number of programs, e.g., operating systems and/or applications, may run on each virtual machine.

In many computer systems, it is often desirable to reduce downtime or inaccessibility caused by failure of a physical host, virtual machine, or a program. However, conventional approaches to diagnosing and recovering from failures address only "hard" failures occurring in the host operating system of a physical host, or a physical failure of the physical host. These traditional approaches do not provide automated methods of diagnosing "soft" failures, such as those failures occurring inside a virtual machine, such as a guest operating system failure or failure of another program running on the virtual machine. Accordingly, systems and methods that provide for diagnosis and recovery of software and operating system failures occurring in virtual machines are desired.

SUMMARY

In accordance with the teachings of the present disclosure, disadvantages and problems associated with diagnosis and recovery of failures in a virtual machine may be substantially reduced or eliminated. For example, the systems and methods disclosed herein may be technically advantageous because they may provide for the recovery of "soft" failures occurring in a virtual machine, while conventional approaches generally provide only for the recovery of "hard" failures of a physical host machine. In a particular embodiment, a system may include a management module operable to determine the occurrence of a program failure in a virtual machine, and further operable to restart the program in response to the failure.

In accordance with one embodiment of the present disclosure, a method for recovering from failures in a virtual machine is provided. The method may include, in a first physical host having a host operating system and a virtual machine running on the host operating system, monitoring one or more parameters associated with a program running on the virtual machine, each parameter having a predetermined acceptable range. The method may further include determining if the one or more parameters are within their respective predetermined acceptable ranges. In response to determining that the one or more parameters associated with the program running on the virtual machine are not within their respective predetermined acceptable ranges, a management module may cause the application running on the virtual machine to be restarted.

In accordance with another embodiment of the present disclosure, a system for recovering from failures in a virtual machine may include a first physical host. The first physical host may include a host operating system, a management module in communication with the host operating system, and a virtual machine running on the host operating system and in communication with the management module. The virtual machine may be operable to run a program and run an agent. The agent may be operable to communicate to the management module one or more parameters associated with the program, each parameter having a predetermined acceptable range. The management module may be operable to determine if the one or more parameters associated with the program running on the virtual machine are within their respective predetermined acceptable ranges, and in response to determining that the one or more parameters are not within their respective predetermined acceptable ranges, cause the application running on the virtual machine to be restarted.

In accordance with a further embodiment of the present disclosure, an information handling system may include a processor, a memory communicatively coupled to the processor, a management module communicatively coupled to the memory and the processor, and a host operating system running on the information handling system and having a virtual machine running thereon. The virtual machine may be in communication with the management module and may be operable to run a program and run an agent. The agent may be operable to communicate to the management module one or more parameters associated with the program, each parameter having a predetermined acceptable range. The management module may be operable to determine if the one or more parameters associated with the program running on the virtual machine are within their respective predetermined acceptable ranges, and in response to determining that the one or more parameters are not within their respective predetermined acceptable ranges, cause the application running on the virtual machine to be restarted.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
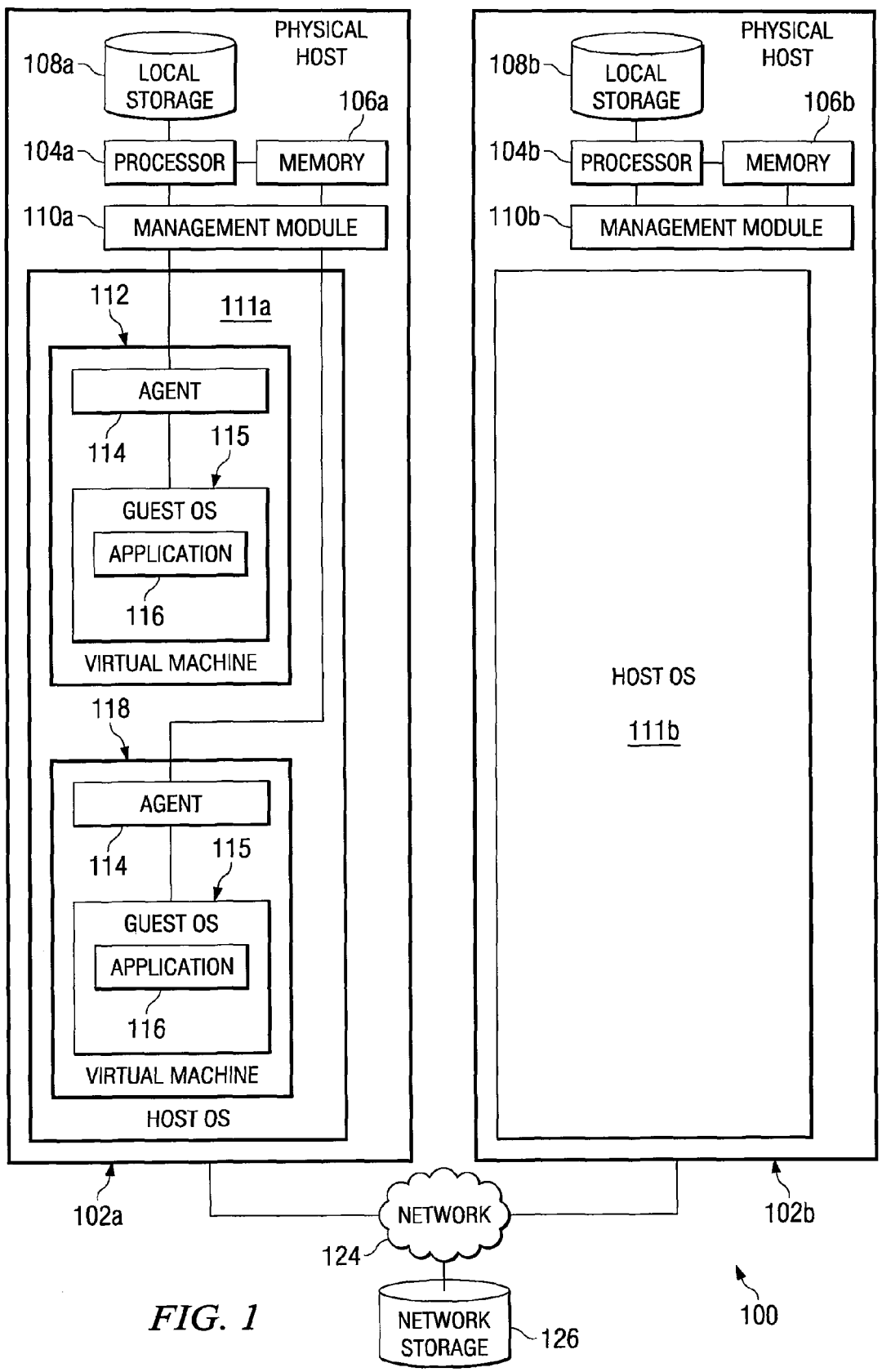
FIG. 1 illustrates a block diagram of an example system for recovering from failures in a virtual machine, in accordance with teachings of the present disclosure.

FIG. 1 illustrates a block diagram of an example system 100 for recovering from failures in a virtual machine, in accordance with teachings of the present disclosure. As shown in FIG. 1, system 100 may include physical hosts 102a and 102b (which may be referred to generally as hosts 102), network 124, and network storage 126. Host devices 102 may include one or more information handling systems, as defined herein, and may be communicatively coupled to network 124. Host devices 102 may be any type of processing device and may provide any type of functionality associated with an information handling system, including without limitation database management, transaction processing, storage, printing, or web server functionality.

Although a specific network is illustrated in FIG. 1, the term "network" should be interpreted as generically defining any network capable of transmitting telecommunication signals, data and/or messages. Network 124 may be a local area network (LAN), a metropolitan area network (MAN), storage area network (SAN), a wide area network (WAN), a wireless local area network (WLAN), a virtual private network (VPN), an intranet, the Internet or any other appropriate architecture or system that facilitates the communication of signals, data and/or messages (generally referred to as media). Network 124 may transmit media using the Fibre Channel (FC) standard, Frame Relay, Asynchronous Transfer Mode (ATM), Internet protocol (IP), other packet-based protocol, and/or any other transmission protocol and/or standard for transmitting media over a network.

Network storage 126 may be communicatively coupled to network 124. Network storage 126 may include any system, device, or apparatus operable to store media transmitted over network 124. Network storage 126 may include, for example, network attached storage, one or more direct access storage devices (e.g. hard disk drives), and/or one or more sequential access storage devices (e.g. tape drives). In certain embodiments, network storage 126 may be SCSI, iSCSI, SAS and/or Fibre Channel based storage.

As depicted in FIG. 1, physical hosts 102 may include a processor 104, a memory 106, local storage 108, a management module 110, and a host operating system 111. In addition, physical hosts 102 may host one or more virtual machines 112, 118 running on host operating system 111. Processor 104 may be any suitable system, device or apparatus operable to interpret program instructions and process data in an information handling system. Processor 104 may include, without limitation, a central processing unit, a microprocessor, a microcontroller, a digital signal processor and/or an application-specific integrated circuits (ASICs). Processors may be suitable for any number of applications, including use in personal computers, computer peripherals, handheld computing devices, or in embedded systems incorporated into electronic or electromechanical devices such as cameras, mobile phones, audio-visual equipment, medical devices, automobiles and home appliances.

Memory 106 may be communicatively coupled to processor 104. Memory 16 may be any system, device or apparatus operable to store and maintain media. For example, memory 106 may include (data and/or instructions used by processor 104. Memory 106 may include random access memory (RAM), electronically erasable programmable read-only memory (EEPROM), a PCMCIA card, flash memory, and/or any suitable selection and/or array of volatile or non-volatile memory.

Local storage 108 may be communicatively coupled to processor 104. Local storage 108 may include any system, device, or apparatus operable to store media processed by processor 104. Local storage 108 may include, for example, network attached storage, one or more direct access storage devices (e.g. hard disk drives), and/or one or more sequential access storage devices (e.g. tape drives).

Management module 110 may be coupled to processor 104, and may be any system, device or apparatus operable to monitor and/or receive information from virtual machines 112, 118 and/or programs 116, 122 running on virtual machines 112, 118, as discussed in greater detail below. Management module 110 may also be operable to manage virtual machines 112 and 118 instantiated on physical hosts 102, including without limitation terminating and/or creating instantiations of virtual machines 112 and 118, as discussed in greater detail below. Management module 110 may be implemented using hardware, software, or any combination thereof. In some embodiments, management module 110 may run on host operating system 111. In other embodiments, management module 110 may run independently of host operating system 111.

Generally speaking, virtual machines 112 and 118 may each operate as a self-contained operating environment that behaves as if it is a separate computer. Virtual machines 112 and 118 may work in conjunction with, yet independent of host operating system 111 operating on physical host 102. In certain embodiments, each virtual machine could be dedicated to the task of handling a single function. For example, in a particular embodiment, virtual machine 112 could be a mail server, while virtual machine 118 present on the same physical host 102a could be a file server. In the same or alternative embodiments, virtual machine 112 could operate using a particular operating system (e.g., Windows®), while virtual machine 118 present on the same physical host 102 may operate using a different operating system (e.g. Mac OS®). In the same or alternative embodiments, the host operating system operating on physical host 102a may operate using a different operating system than the operating systems operating on virtual machines 112, 118 present on physical host 102a. For example, physical host 102a may operate using UNIX®, while virtual machine 112 may operate using Windows®, and virtual machine 118 may operate using Mac OS®.

Each virtual machine 112, 118 may include an agent 114, and programs including a guest operating system 115, and one or more applications 116. As used in this disclosure, the term "program" may be used to refer to any set of instructions embodied in a computer-readable medium and executable by an information handling system, and may include, without limitation, operating systems and applications. As used in this disclosure, "guest operating system" may be any program that manages other programs of a virtual machine, and interfaces with a host operating system running on a physical host 102. As used in this disclosure, "application" refers to any program operable to run on a guest operating system that may be written to perform one or more particular tasks or functions (e.g., word processing, database management, spreadsheets, desktop publishing, graphics, finance, education, telecommunication, inventory control, payroll management, Internet browsing and/or others).

Agent 114 may be any system, device or apparatus operable to monitor one or programs 115, 116 running on a virtual machine 112, 118, and/or send messages to a management module 110, as described in greater detail below. Agent 114 may be implemented using hardware, software, or any combination thereof.

In operation, management module 110, along with agents 114 associated with each virtual machine 112, 118 instantiated on a physical host may monitor one or more parameters associated with a program 115, 116 running on a virtual machine 112, 118. For instance, agent 114 associated with each virtual machine 112, 118 may monitor parameters indicative of the resource utilization of a program 115, 116, such as processor utilization, memory utilization, disk utilization, and/or network utilization, for example. In the same or alternative embodiments, agent 114 may monitor parameters related to the "health" of a program 115, 116, such as whether the program is running and/or whether the program has access to required resources and/or services.

Each agent 114 may communicate to its associated management module 110 regarding the monitored parameters. In addition, management module 110 may also monitor any number parameters related to a virtual machine 112, 118 or a program 114, 115 running thereon, including those program parameters monitored by agents 114. For example, management module may monitor whether or not an agent 114 is running on a virtual machine 112, 118. If management module 110 determines an agent 114 is not running on a virtual machine 112, 118, this may indicate a problem or failure associated with the particular virtual machine 112, 118.

Management module 110 may be further operable to determine if the one or more monitored parameters are within a respective predetermined acceptable range. A respective predetermined acceptable range for a particular parameter may be any suitable range of numerical or logical values. For example, a predetermined acceptable range for processor utilization of a particular program 115, 116, may be a range of percentage values. As another example, another parameter may indicate whether a particular program 115, 116 is running on a virtual machine 112, 118, and may have a logical value of "yes" or "true" or to indicate the program is running, and a logical value of "no" or "false" to otherwise indicate that the program is not running. In such a case, the predetermined acceptable range for the parameter may be the logical value "yes" or "true."

A predetermined acceptable range for a parameter may be set automatically or manually. In certain embodiments, one or more predetermined acceptable ranges may be determined by a manufacturer. In the same or alternative embodiments, one or more predetermined acceptable ranges may be determined by a user and/or system administrator. In the same or alternative embodiments, one or more predetermined acceptable ranges may be based on the types of computing resources comprising system 100. For example, one or more predetermined ranges may be based on processing capacity, storage capacity, type of storage, memory capacity, network capacity, type of network, operating system, application, and/or any other number of suitable factors.

The existence of a parameter associated with a program falling outside of the parameter's respective predetermined acceptable range may indicate a failure of the program. For instance, a determination that processor usage by a particular program is excessive may indicate a failure in such program. As used in this disclosure, the term "failure" includes actual failures, potential failures, impending failures and/or any other similar event.

In response to determining that one or more parameters associated with a program are not within their predetermined acceptable ranges, management module 110 may trigger an event. An event may include any action and/or response within system 100 that may cure a failure indicated by a parameter not falling within its predetermined acceptable range. For example, an event may comprise management module 110 or another component of system 100 issuing notification to a user and/or system administrator, such as an alert and/or e-mail message, for example. In addition, an event may comprise the allocation of more computing resources (e.g. processor capacity, memory capacity, storage capacity and/or network capacity) to a virtual machine 112, 118 and/or a program 115, 116 running thereon. For example, in response to a determination that a parameter related to memory usage of a program 115, 116 is outside of its respective predetermined acceptable range, management module 110 may cause host 102a to allocate more memory to program 115, 116.

Figure 3:
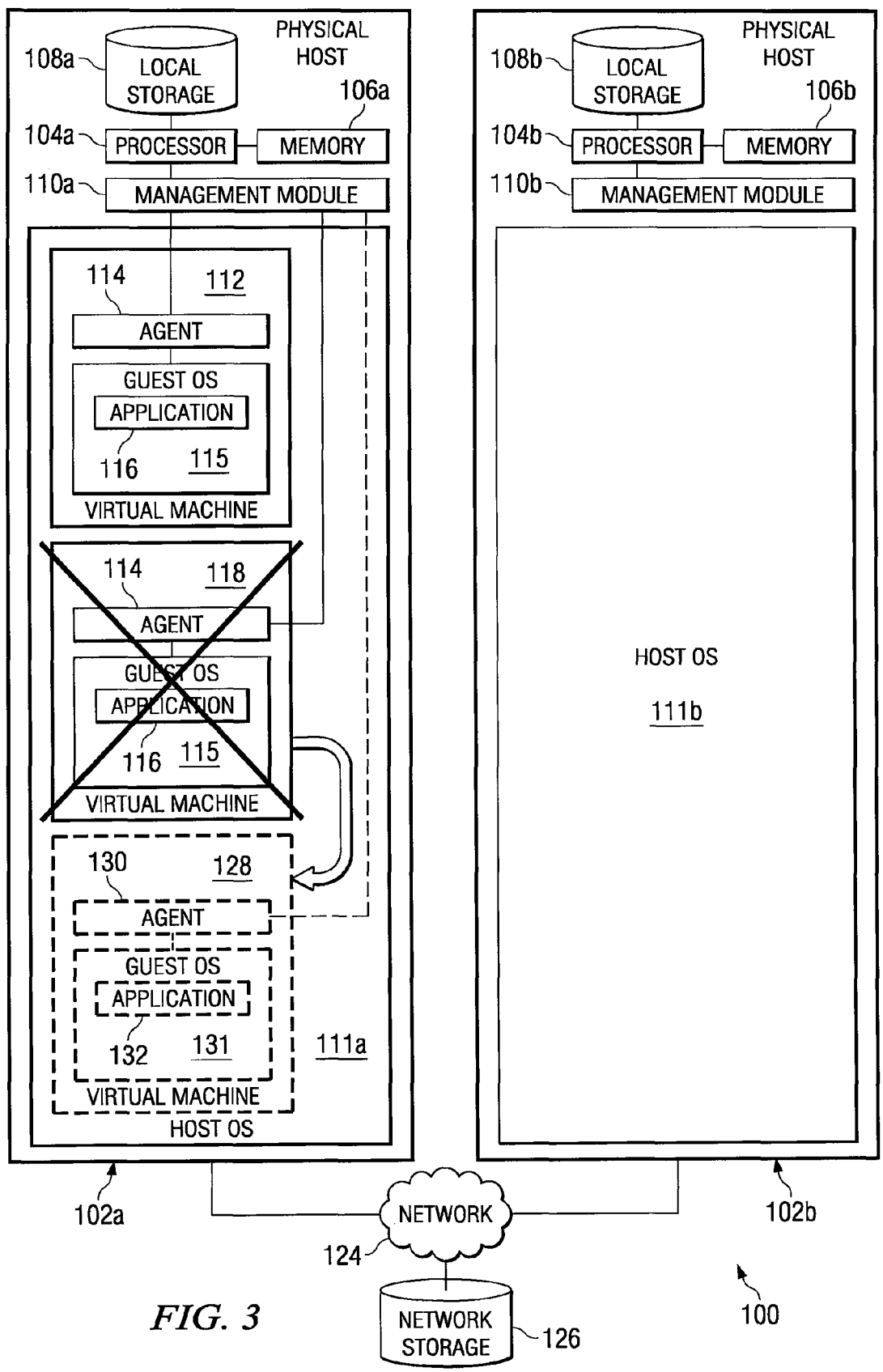
FIG. 3 illustrates the block diagram of the system of FIG. 1, demonstrating the restarting of a program by re-instantiating a virtual machine on a physical host, in accordance with the present disclosure.
Figure 4:
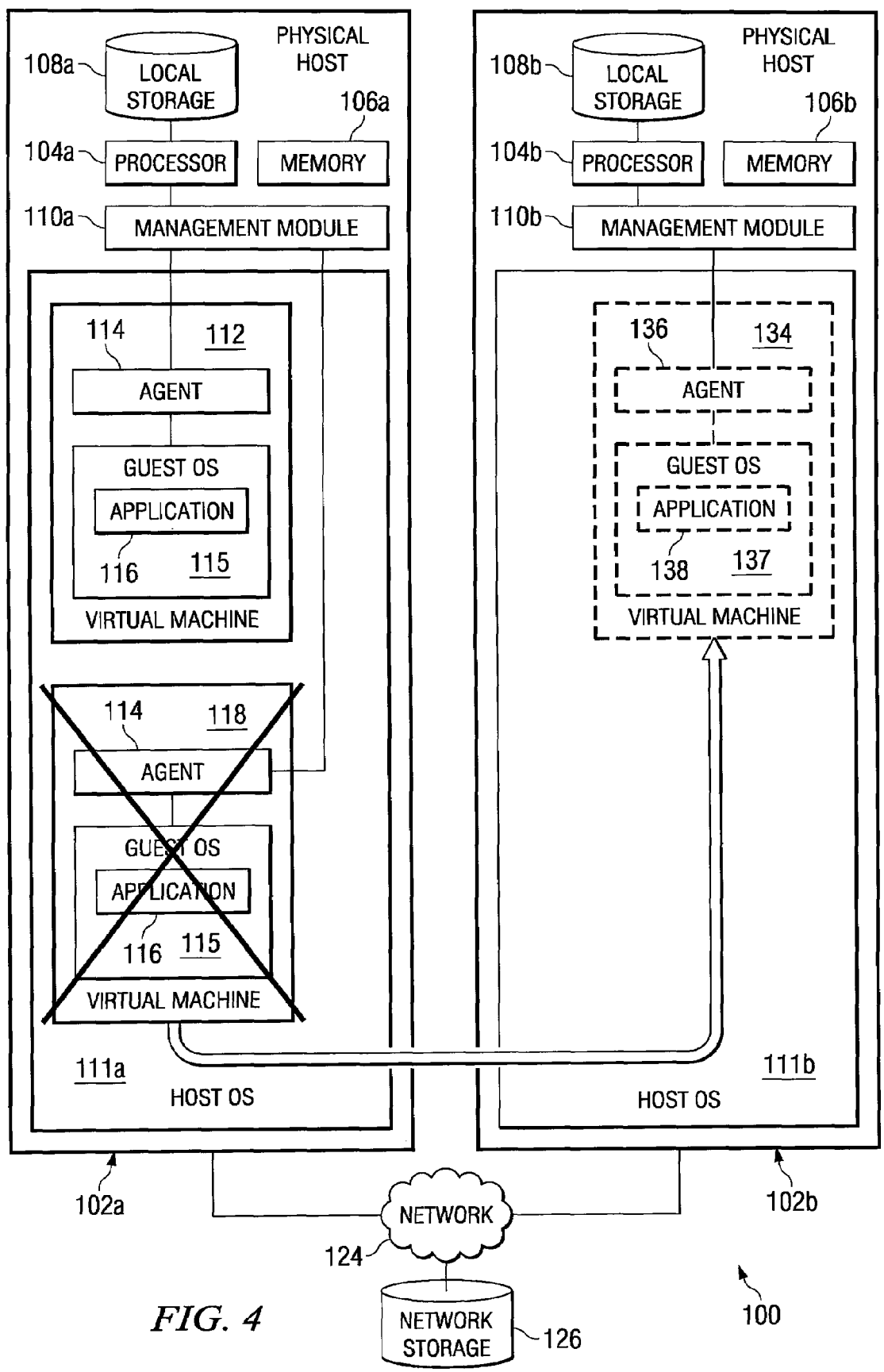
FIG. 4 illustrates the block diagram of the system of FIG. 1, demonstrating the restarting of a program by re-instantiating a virtual machine on a second physical host, in accordance with the present disclosure.

An event may also comprise the instantiation of a new virtual machine 112, 118 and/or program 115, 116. In the same or alternative embodiments, an event may comprise restarting a program 115, 116. For example, if management module 110 detects a failure of a program 115, 116 running on virtual machine 112, it may cause the program 115, 116 to be terminated and restarted on the same virtual machine 112. Alternatively, if a management module 110 detects a failure of a program 115, 116 running on virtual machine 112, it may cause the re-instantiation of the virtual machine 112 on host 102a, and cause the program 115, 116 to be restarted on the re-instantiated virtual machine 112 (as depicted in FIG. 3). Alternatively, if a management module 110 detects a failure of a program 115, 116 running on virtual machine 112, it may cause the re-instantiation of the virtual machine 112 on host 102b, and cause the program 115, 116 to be restarted on the re-instantiated virtual machine 112 (as depicted in FIG. 4).

Although FIG. 1 depicts a system 100 comprising two hosts 102a and 102b, it is understood that system 100 may comprise any number of hosts 102. In addition, although FIG. 1 depicts host 102a comprising virtual machines 112 and 118, it is understood that hosts 102 may comprise any number of virtual machines. Moreover, although FIG. 1 depicts one guest operating system 115 and one application 116 running on each of virtual machines 112 and 118, it is understood that any number of programs 115, 116 may run on virtual machines 112, 118.

Although virtual machines 112 and 118 are depicted as comprising agents 114, it is understood that agents 114 may be implemented independently of virtual machines 112, 118. Similarly, although application 116 is depicted as running on guest operating system 114, it is understood that application 116 may run independently of guest operating system 115.

Figure 2:
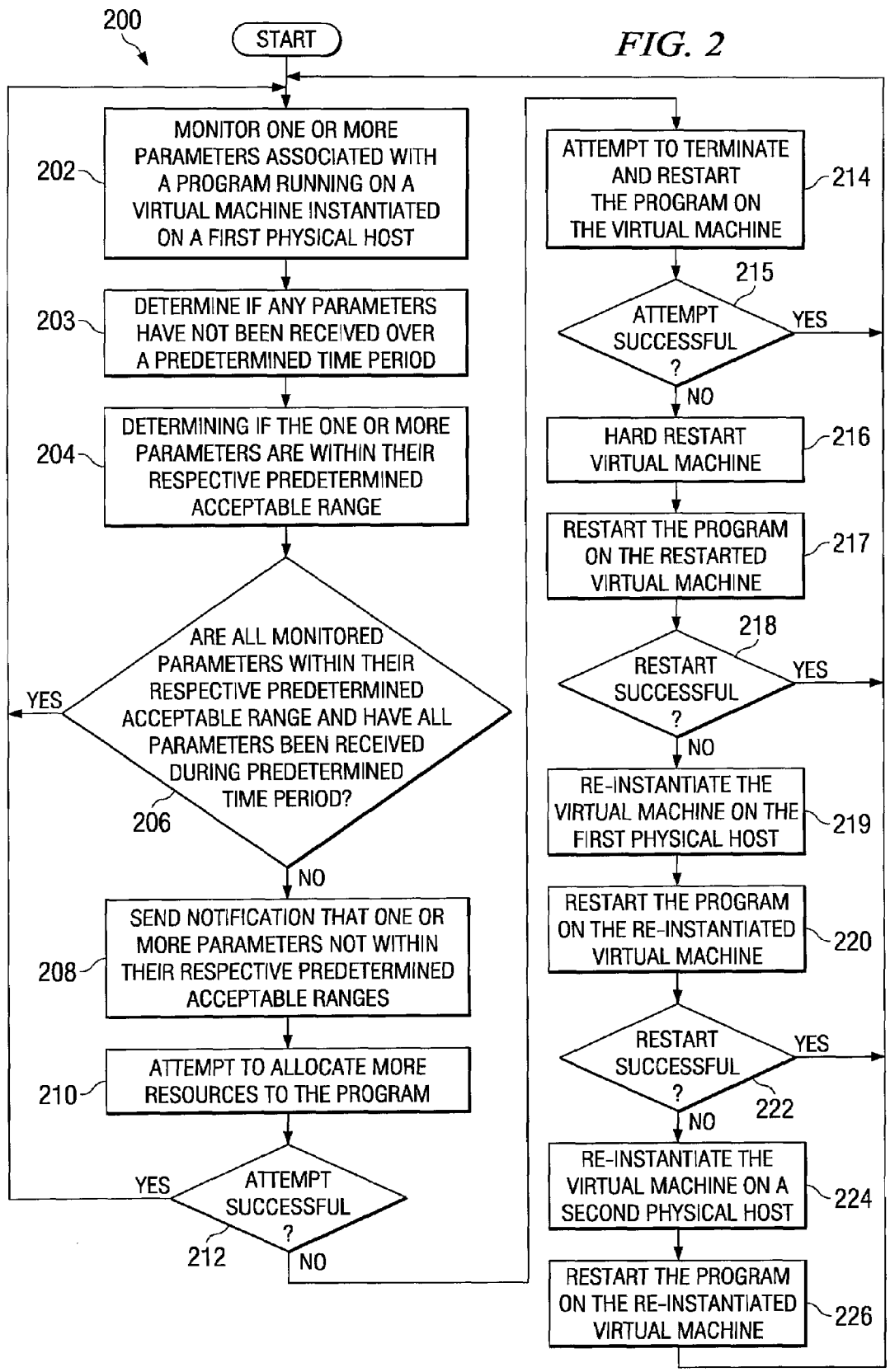
FIG. 2 illustrates a flow chart of a method for recovering from failures in a virtual machine, in accordance with teachings of the present disclosure.

FIG. 2 illustrates a flow chart of an example method 200 for recovering from failures in a virtual machine environment. In one embodiment, method 200 includes monitoring one or more parameters associated with a program 115, 116 running on a virtual machine 112, 118 and triggering an event if the one or more of the monitored parameters fall outside the predetermined acceptable range.

According to one embodiment, method 200 preferably begins at step 202. Teachings of the present disclosure may be implemented in a variety of configurations of system 100. As such, the preferred initialization point for method 200 and the order and identity of the steps 202-226 comprising method 200 may depend on the implementation chosen.

At step 202, agent 114, management module 110, or another component system 100 may monitor one or more parameters associated with a program 115, 116 running on a virtual machine 118 instantiated on physical host 102a. At step 203, management module 110 or another component of system 100 may determine if any of the one or more monitored parameters has not been received over a predetermined time period. For example, management module 110 may determine whether or not agent 114 has failed to communicate a particular parameter value to the management module for a predetermined time period. The predetermined time period or "timeout" period, may be any suitable length of time, and may be automatically or manually determined. Failure of management module 110 to receive a particular parameter value may indicate a failure of virtual machine 118 or a program 115, 116 running thereon.

At step 204, management module 110 or another component of system 100 may determine if the one or more parameters are within their respective predetermined acceptable ranges, as discussed in greater detail above with respect to FIG. 1. If it is determined that all of the parameters are being received are and are within their respective predetermined acceptable ranges, method 200 may, at step 206, proceed again to step 202, in which case the loop of steps 202-206 may repeat until a parameter is determined to be outside of its respective predetermined acceptable range. Alternatively, if one or more monitored parameters are not within their predetermined acceptable ranges, method 200 may, at step 206, proceed to step 208.

At steps 208-226, management module 110 or another component of system 100 may trigger and/or execute one or more events in response to a determination that a parameter is not within its respective predetermined acceptable range. For example, at step 208, management module 110 or another component of system 100 may send a notification (such as an alert or email, for example) to a user and/or system administrator that one or more parameters are not within their respective predetermined acceptable ranges. At step 210, management module 110 or another component of system 100 may attempt to allocate more computing resources to the program 115, 116. For example, more processor capacity, memory capacity, storage capacity, network capacity and/or other resource may be allocated to program 115, 116.

At step 212, management module 110 or another component of system 100 may make a determination of whether the allocation of more resources to program 115, 116 was successful in bringing all monitored parameters within their respective predetermined acceptable ranges. If successful, method 200 may proceed again to step 202 where the parameters may continue to be monitored. On the other hand, if the allocation of additional resources 115, 116 was not successful, method 200 may proceed to step 214.

At step 214, management module 110 or another component of system 100 may attempt to terminate program 115, 116 and restart it on the same virtual machine 118. If the attempt is successful in bringing all monitored parameters within their respective predetermined acceptable ranges, method 200 may, at step 215, proceed again to step 202 where the parameters may continue to be monitored. Otherwise, method 200 may, at step 215, proceed to step 216.

At step 216, management module 110 or another component of system 100 may perform a hard restart of virtual machine 118 on the same host 102a. A hard restart of virtual machine 118 may comprise shutting down virtual machine and powering it up again. At step 217, management module 110 or another component of system 100 may restart program 115, 116 on the restarted virtual machine 118. If this restart of program 115, 116 is successful in bringing all monitored parameters within their respective predetermined acceptable ranges, method 200 may, at step 218, proceed again to step 202 where the parameters may continue to be monitored. Otherwise, method 200 may, at step 218, proceed to step 219.

At step 219, management module 110 or another component of system 100 may re-instantiate virtual machine 118 as virtual machine 128 on the same host 102a, as depicted in FIG. 3. At step 220, management module 110 or another component of system 100 may restart program 115, 116 as program 131, 132 on the re-instantiated virtual machine 128. If this restart of program 115, 116 as program 131, 132 is successful in bringing all monitored parameters within their respective predetermined acceptable ranges, method 200 may, at step 222, proceed again to step 202 where the parameters may continue to be monitored. Otherwise, method 200 may, at step 222, proceed to step 224.

At step 224, management module 110 or another component of system 100 may re-instantiate virtual machine 118 as virtual machine 132 on a second host 102b, as depicted in FIG. 4. At step 226, management module 110 or another component of system 100 may restart program 115, 116 as program 137, 138 on the re-instantiated virtual machine 132.

Although FIG. 2 discloses a particular number of steps to be taken with respect to method 200, it is understood that method 200 may be executed with greater or lesser steps than those depicted in FIG. 2. For example, in certain embodiments of method 200, steps 208-212 may not be executed. Method 200 may be implemented using system 100 or any other system operable to implement method 200. In certain embodiments, method 200 may be implemented in software embodied in tangible computer readable media.

Although the present disclosure has been described in detail, it should be understood that various changes, substitutions, and alterations can be made hereto without departing from the spirit and the scope of the invention as defined by the appended claims.

What is claimed is:

1. A method of recovering from failures in a virtual machine, comprising:
    in a first physical host having a host operating system and a virtual machine running on the host operating system, monitoring one or more parameters associated with a program running on the virtual machine, each parameter having a predetermined acceptable range;
    determining if the one or more parameters are within their respective predetermined acceptable ranges;
    in response to determining that the one or more parameters associated with the program running on the virtual machine are not within their respective predetermined acceptable ranges, a management module causing the application running on the virtual machine to be restarted; wherein restarting the program comprises re-instantiating the virtual machine on a second physical host, and restarting the program on the re-instantiated virtual machine.

2. A method according to claim 1, wherein the one or more parameters are selected from the group consisting of processor utilization, memory utilization, disk utilization, network utilization.

3. A method according to claim 1, wherein the one or more parameters are indicative of the program's health and the program's health may be indicated by at least one of a determination of whether the program is running and a determination of whether adequate services and resources are available to the program.

4. A system for recovering from failures in a virtual machine, comprising: a first physical host, the first physical host comprising:
    a host operating system;
    a management module in communication with the host operating system;
    a virtual machine running on the host operating system and in communication with the management module, the virtual machine operable to:
    run a program; and
    run an agent operable to communicate to the management module one or more parameters associated with the program, each parameter having a predetermined acceptable range; and
    the management module operable to:
    determine if the one or more parameters associated with the program running on the virtual machine are within their respective predetermined acceptable ranges; and
    in response to determining that the one or more parameters are not within their respective predetermined acceptable ranges, cause the application running on the virtual machine to be restarted; wherein restarting the program comprises re-instantiating the virtual machine on a second physical host, and restarting the program on the re-instantiated virtual machine.

5. A system according to claim 4, wherein the one or more parameters are selected from the group consisting of processor utilization, memory utilization, disk utilization, network utilization.

6. A system according to claim 4, wherein the one or more parameters are indicative of the program's health, wherein the program's health may be indicated by at least one of a determination of whether the program is running and a determination of whether adequate services and resources are available to the program.

7. An information handling system comprising:
    a processor;
    a memory communicatively coupled to the processor;
    a management module communicatively coupled to the memory and the processor; and
    a host operating system running on the information handling system and having a virtual machine running thereon, the virtual machine in communication with the management module and operable to:
    run a program; and
    run an agent operable to communicate to the management module one or more parameters associated with the program, each parameter having a predetermined acceptable range; and
    the management module is operable to:
    determine if the one or more parameters associated with the program running on the virtual machine are within their respective predetermined acceptable ranges; and
    in response to determining that the one or more parameters are not within their respective predetermined acceptable ranges, cause the application running on the virtual machine to be restarted; wherein restarting the program comprises re-instantiating the virtual machine on a second physical host, and restarting the program on the re-instantiated virtual machine.

8. An information handling system according to claim 7, wherein the one or more parameters are selected from the group consisting of processor utilization, memory utilization, disk utilization, network utilization.

9. A information system according to claim 7, wherein the one or more parameters are indicative of the program's health, wherein the program's health may be indicated by at least one of a determination of whether the program is running and a determination of whether adequate services and resources are available to the program.

* * * * *